United States Patent

Balke

[15] 3,635,427
[45] Jan. 18, 1972

[54] AIRCRAFT VIBRATION COMPENSATION SYSTEM

[72] Inventor: Rodney W. Balke, Dallas, Tex.
[73] Assignee: Textron, Inc., Wheatfield, N.Y.
[22] Filed: May 6, 1969
[21] Appl. No.: 822,136

[52] U.S. Cl................................244/17.27, 248/20, 248/358
[51] Int. Cl.........................................................B64c 27/00
[58] Field of Search.............244/17.11, 17.25, 17.27, 17.13; 318/128; 248/19, 20, 358, 15, 350; 416/500; 188/1 B, 1 E

[56] References Cited

UNITED STATES PATENTS

| | | | |
|---|---|---|---|
| 3,172,630 | 3/1965 | Goodman | 248/20 |
| 3,483,951 | 12/1969 | Bonesho et al. | 188/1 E |
| 2,988,684 | 6/1961 | Rijckaert | 318/128 |
| 3,331,239 | 7/1967 | Larsen et al. | 318/128 X |
| 3,385,131 | 5/1968 | Hall et al. | 416/500 X |
| 3,477,665 | 11/1969 | Legrand | 244/17.25 |
| 3,497,164 | 2/1970 | Horak | 244/17.27 |
| 3,509,971 | 5/1970 | Gerstine et al. | 244/17.11 X |
| 3,514,054 | 5/1970 | Mard et al. | 244/17.27 |

*Primary Examiner*—Trygve M. Blix
*Assistant Examiner*—Paul E. Sauberer
*Attorney*—Kenyon & Kenyon Reilly Carr & Chapin

[57] ABSTRACT

Apparatus is disclosed to compensate for forces that are applied to the aircraft pylon from rotor blade vibratory disturbances in a rotary wing aircraft. The compensation is such that the effect of the vibratory disturbances on the pilot's cabin, or at any other desired area in the fuselage, is minimized. The apparatus includes a signal generating device that generates a signal having the same frequency as the frequency of the forces resulting from the rotor blade vibratory disturbances. The signal is employed to control the frequency of compensating forces or motions that are applied by the apparatus of this invention between the pylon and the fuselage. Control over the amplitude and phase of the compensating forces or motions applied between the pylon and the fuselage by the apparatus of this invention will establish an amplitude and phase for the net forces and moments on the fuselage of such a fashion that a desired portion of the fuselage, such as the pilot's cabin, can be effectively insulated from the effects of the rotor blade vibratory disturbances.

4 Claims, 5 Drawing Figures

INVENTOR.
RODNEY W. BALKE
BY Kenyon & Kenyon
ATTORNEYS

INVENTOR.
RODNEY W. BALKE
BY Kenyon & Kenyon
ATTORNEYS

AIRCRAFT VIBRATION COMPENSATION SYSTEM

This invention relates in general to a vibration control system and more particularly to a system for controlling the vibration in the fuselage of a helicopter so as to compensate for the vibratory forces generated by the rotating rotor blades.

BACKGROUND OF THE INVENTION

Rotary wing aircraft, such as helicopters and autogyros, produce considerable vibration due to the rotation of the rotor blades, which vibration is felt in the aircraft by pilot and passengers. In order to provide a more comfortable and less fatiguing ride and also to minimize distractions on the pilot, it is clearly desirable to minimize the impact of the rotor generated vibrations on the fuselage, or at least on those portions of the fuselage occupied by the pilot and/or passengers. The following discussion will refer to a helicopter having two rotor blades, realizing that similar conditions apply to helicopters having more than two blades although the frequency of the vibratory disturbances and their amplitudes will differ.

The major vibratory disturbances caused by the rotation of the rotor blades in a two-bladed helicopter are called one/rev and two/rev disturbances. These two disturbances can be considered essentially sinusoidal disturbances transmitted from the pylon (normally, the gear box, rotor shaft and rotor blade) to the fuselage. The one/rev disturbance is an approximately sinusoidal force disturbance having a period equal to the time it takes for one complete 360° rotation of the rotor blades. A two/rev disturbance is an essentially sinusoidal force disturbance having a period equal to the time it takes for 180° rotation of the two-bladed rotor blades.

A one/rev disturbance may be caused by out of balance rotor blades, meaning specifically a situation where one of the two rotor blades has greater mass or greater inertia than the other. The resulting one/rev force disturbance due to out of balance occurs in a horizontal plane. Another source of one/rev disturbance may be when the helicopter blades are out of track, meaning specifically that due to differences in aerodynamic characteristics one of the blade tips is higher than the other blade tip. An out of track condition results in a one/rev disturbance in an essentially vertical direction. These one/rev forces are transmitted from the rotor blades through the pylon to the fuselage and are felt by the pilot and passengers.

Two/rev disturbances result in large part from the asymmetric flow of air across the two rotor blades. This asymmetric flow of air results substantially from the fact that for counterclockwise rotation when viewed from above, the rotor blade on the right is moving forward with the ship, while the other rotor blade is moving backward. The result is an inevitable two/rev disturbance in any two-bladed helicopter. The two/rev disturbance is manifested in both a horizontal force component and a vertical force component.

Although one/rev vertical disturbances can be minimized by assuring proper blade balance and blade tracking, the two/rev disturbance is an inevitable concomitant of two-bladed helicopter flight.

The fuselage normal modes of vibration are excited by the combination of vertical shear, pitch moments and roll moments which result from the above-mentioned causes.

Various attempts to minimize the effects of rotor blade vibratory disturbances have been made but have had only limited success. One known technique attempted to confine the disturbing forces to the pylon structure by the use of springs and/or elastomeric mounts positioned about the helicopter pylon. The intent of this design was to have the springs and/or elastomeric mounts permit small pylon motions to occur relative to the fuselage such that the combined inertial forces from the pylon motion and the spring forces would serve to dissipate the forces resulting from the disturbances, thus isolating the forces from the helicopter fuselage. To achieve suitable isolation it is necessary that the pylon vertical and rocking natural frequencies be considerably lower than the frequency of the vibratory disturbances. The consequence is a relatively soft and unacceptable isolating system, unacceptable in that the forces resulting from rotor lift and counter torque caused relatively large pylon deflections that could not be accommodated by the control system and other functional components. Most operational pylon isolation systems achieve a compromise, providing lower static deflections and less than optimum isolation. Other isolating apparatus such as linkages located between the pylon fuselage interface have been used but only with limited success.

The known techniques directed to isolating the effects of rotor blade vibratory disturbances, as exemplified by the above-described devices, failed to deal with and to control the different components of the forces resulting from the rotor blade vibratory disturbances. These techniques attempted to dissipate the energy associated with the disturbing vibrations without regard to the direction of the force components of the disturbances and without attempting to control and minimize these individual components.

Certain components of the vibratory forces in the fuselage are due to oscillating aerodynamic forces, such as from the asymmetry of airflow; other components are due to rotor blade dynamic response; while yet other components are due to geometric asymmetries, such as out of balance and out of track blades. To simplify reference herein, all such forces will be referred to as rotor blade vibratory forces in recognition of the fact that these forces all arise from rotor blade operation.

It is a major purpose of this invention to compensate for the effects of rotor blade vibratory disturbances so as to provide a ride for the pilot which is relatively free of vibrations that result from the action of the rotor blades.

However, in compensating for the vibratory forces on the fuselage due to rotor blade operation, it is important that the net effect on the fuselage avoid greatly increased stresses and strains along any point of the fuselage.

Since the major rotor blade vibratory disturbances are at the one/rev and two/rev frequencies, it is a more specific object of this invention to provide a system that will control forces at these frequencies.

Furthermore, since the one/rev and two/rev vibratory forces may occur laterally and longitudinally as well as vertically, it is another purpose of this invention to provide a system which can be adapted to control vibratory disturbances along any desired axis or axes.

Because the major application for the design of this invention is an aircraft, it is an important purpose of this invention that the apparatus involved to achieve the foregoing objects be light in weight, simple in construction and reliable in operation.

SUMMARY OF THE INVENTION

Briefly, in accordance with the present invention, a mechanism is connected between the helicopter fuselage and the pylon to provide an additional applied sinusoidal force between the pylon and the fuselage. A hydraulically operated cylinder and piston is one example of the force providing mechanism which can be employed. The cylinder may be fixed relative to the fuselage and the piston fixed relative to the pylon. A means is then provided for sinusoidally hydraulically actuating the piston at a frequency equal to that of the vibratory force for which control and compensation is desired. The frequency is obtained from a pickoff mechanism associated with the rotating mast that provides a signal whose frequency is a function of the rotational speed of the rotor blades. Where a one/rev disturbance is concerned, this signal is equal to the rotational speed of the rotor blade. Where a two/rev disturbance is concerned, this signal is twice the rotational speed of the rotor blades. The signal is then appropriately amplified and applied to the hydraulic circuit in order to cause fluid flow to vary at the frequency of the signal thus picked up. A manually operable means, such as a variable resistor, is provided in the electrical circuitry to permit pilot control over the magnitude of the signal and thus obtain pilot control over the magnitude of the force inserted between pylon and fuselage by the mechanism of this invention. Further employment of a synchro type of transformer in the electric circuitry permits pilot control over the phase of the sinusoidal force inserted between pylon and fuselage. By controlling the amplitude and phase of the force inserted, the pilot is able to minimize the net effective vibration at the pilot's seat.

Separate pick up means for the one/rev signal and the two/rev signal can be employed with separate amplitude and phase controls to provide a composite signal for controlling the hydraulic circuit that provides the inserted force. In this fashion, the pilot by varying amplitude and/or phase of the one/rev and two/rev signal can obtain a minimization of both one/rev and two/rev disturbances.

Furthermore, the use of multiple hydraulically actuated pistons at angles to each other can provide the capability for controlling the net forces along all three axes; vertical, lateral and longitudinal.

BRIEF DESCRIPTION OF THE DRAWINGS

Other objects, aspects and features of the present invention will be apparent from the following description and drawings in which.

DESCRIPTION OF THE PREFERRED EMBODIMENTS

FIG. 1 Embodiment

Figure 1:
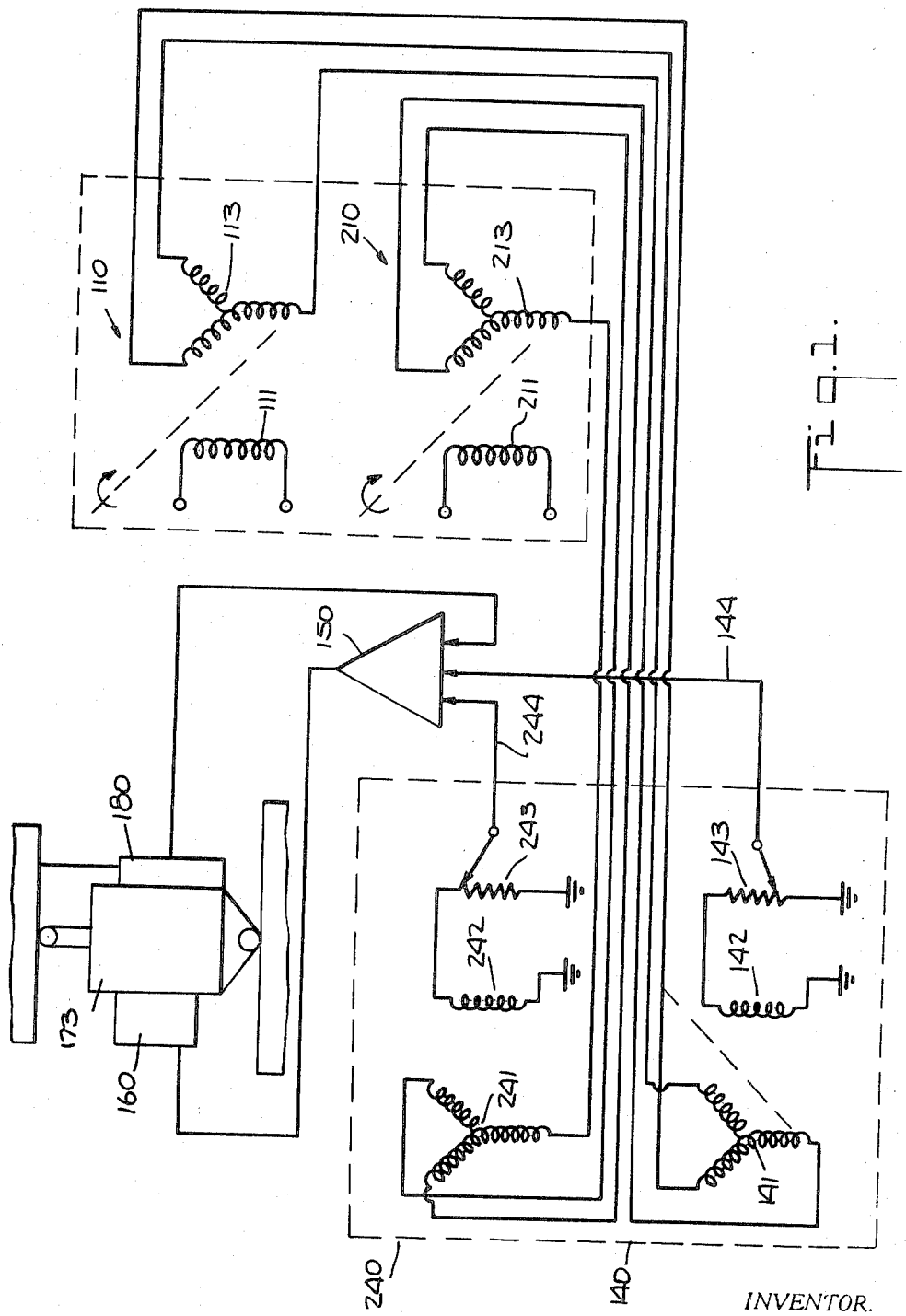
FIG. 1 is a schematic illustration of an embodiment of the invention.

Referring now to the drawings and more particularly to FIG. 1, a first synchro-drive transformer 110 is seen to include a first coil 111 and a rotatable wye (Y) coil 113. It is of course understood that while coil 113 is shown as being a "Y" winding, a delta winding could be used if desired. Coil 111 can be excited by any alternating current source that is available on a helicopter. Rotatable coil 113 is rotated at the same speed as is the helicopter rotor. This can be done by directly coupling the coil 113 to the helicopter rotor. Coil 113 then rotates at the same frequency as those disturbances which occur sinusoidally for each revolution of the helicopter blade. These disturbances are called one/rev disturbances because they are sinusoidally repetitive once for each 360° revolution of the rotor blades. Their frequency is equal to the rotational frequency of the rotor blades.

A second synchro-drive transformer 210 is similar to transformer 110 and elements of transformer 210 identical to elements of transformer 110 have the same last two digits as the elements of transformer 110 but are prefaced by the numeral 2. Rotatable coil 213 of transformer 210 is driven at twice the helicopter rotor speed by, for example, using step-up gearing to produce a signal having the same frequency as the two/rev disturbances. The two/rev disturbances are significant in a two bladed helicopter since twice during each revolution of the rotor shaft the same general force distribution occurs. Thus the two/rev frequency is exactly twice that of the one/rev frequency.

Slip rings or brushes are used with coils 113 and 213 to pick off the signals produced by the coils. The outputs of the coils 113 and 213 are coupled to "Y" coils 141 and 241, respectively, which are part of the one/rev and two/rev controls, 140 and 240, respectively. As with transformers 110 and 210, the one/rev and two/rev controls are similar to each other and like elements in each control have the same last two digits only prefaced by the numeral 2 for the two/rev control and by the numeral 1 for the one/rev control. As the controls function in a manner similar to each other a description of one control will provide an understanding of the invention.

Adjacent to coil 141 of one/rev control 140 is a transformer circuit containing a variable inductor coil 142 and a variable resistor 143. The controls for changing the inductance of coil 142 and the resistance of variable resistor 143 are preferably located on the pilot console. The means for changing the resistance of resistor 143 may consist of merely changing the tap point where conductor 144 taps resistor 143. Conductor 144 leads to a summing amplifier 150 as does conductor 244 from the two/rev system.

If it is desired to change the phase of the signal supplied to amplifier 150 from the one/rev control, all that is necessary is to vary the inductance of coil 142 by the control therefor while if it is desirable to change the amplitude of the signal supplied to amplifier 150 from the one/rev control the resistance of resistor 143 will be varied by the control therefor. The output of amplifier 150 controls a servo valve 160 and the position of piston 173 which is housed in a hydraulic cylinder 170, the cylinder 170 being fixed relative to the fuselage and the piston 173 being coupled to the pylon. A datum transducer 180 is connected between the pylon and fuselage (or connected to parts fixed relative to the pylon and fuselage) to provide a datum level feedback to amplifier 150. A preferred embodiment of the hydraulic circuitry is described in connection with FIG. 5.

Figure 5:
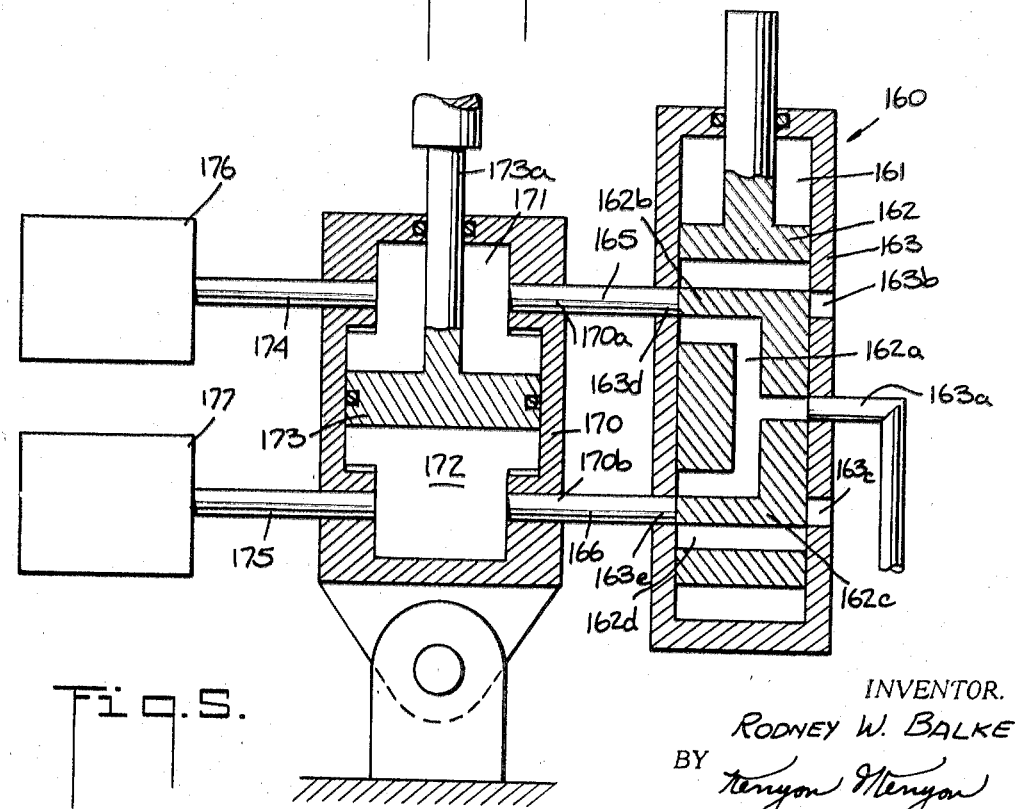
FIG. 5 is a schematic illustration of a preferred hydraulic circuit for use in the present invention.

Referring to FIG. 5 it can be seen that the servo valve 160 includes a solenoid 161 which controls the displacement of the spool 162 in the housing 163. The housing 163 includes an inlet port 163a and a pair of vent discharge ports 163b and 163c. Conduits 165 and 166 connect ports 163d and 163e of housing 163 with ports 170a and 170b of cylinder 170 and thus with the chambers 171 and 172 located on opposite sides of the piston 173 in cylinder 170.

Conduits 174 and 175 connect chambers 171 and 172, respectively, to surge tanks 176 and 177, respectively. These surge tanks are preferable where there are higher frequency signals which are transmitted through the hydraulic system, since the tanks tend to soften the system and thus isolate the higher frequencies.

Spool 162 includes a passage 162a which directs flow from inlet port 163a to the chambers 171 or 172 as is hereinafter explained. The fluid supplied to inlet port 163a will not be directed to either chamber 171 or 172 when the spool is in the neutral position shown in FIG. 5, and spool sections 162b and 162c will prevent fluid from discharging to the cylinder discharge ports 163b and 163c.

When solenoid 161 is energized to lift spool 162, as viewed in FIG. 5, port 163a and the fluid supplied thereto will be connected via passage 162a, port 163d, conduit 165 and port 170a to chamber 171, and chamber 172 will be vented via port 170b, conduit 166, port 163e, passage 162d and discharge port 163c. This will result in piston 173 and rod 173a moving in a downward direction. When the direction of the signal applied to solenoid 161 changes, spool 162 will move down and piston 173 and rod 173a will be driven up.

The FIG. 1 embodiment is illustrated to compensate for the vertical component of the forces resulting from the rotor blade vibratory disturbances. Thus the rod 173a is positioned to exert a vertical force between the helicopter pylon and fuselage. Of course, it is to be understood that in actual practice it is difficult to position the piston rod directly beneath the pylon and the showing in FIG. 1 of the piston rod directly below the pylon is for illustrative purposes only.

Since the fuselage dynamic response is produced by the summation of the oscillatory shears and moments acting on the structure, it may be desirable to offset the piston rod from the rotor shaft axis in order to introduce compensating moments as well as compensating shears.

Furthermore, if it were desired to compensate for a different force component of the rotor blade vibratory disturbances the piston rod 173a would be positioned accordingly.

During flight, the effects of the rotor blade vibratory disturbances will be felt physically as vibrations by the pilot who is located in the helicopter fuselage. By the nature of the vibrations and the frequency thereof an experienced helicopter pilot can tell if the vibrations are primarily a result of one/rev or two/rev disturbances, or a combination thereof.

In operation, if the vibrations result from a two/rev disturbance, the pilot will generally be able to feel that such is the case. He may then first introduce an initial magnitude of two/rev compensation and then adjust the phase of the two/rev controls. Specifically, he will vary the inductance of the coil 242 until the signal produced by the two/rev control (which signal has a frequency equal to the two/rev disturbance) results in a felt decrease or minimization in the effect on the pilot of the forces resulting from the two/rev rotor blade vibratory disturbance. He will then adjust the amplitude of the two/rev force applied between the pylon and the fuselage by the piston 173a. This is achieved by the pilot's varying the resistance of the resister 243 and hence the magnitude of the signal applied to the amplifier 150 and solenoid 161. By a series of successive approximations on the amplitude and phase controls, the pilot will obtain a minimization of the felt effects of the two/rev rotor blade vibratory disturbances. By manipulation of the phase and amplitude controls, he will be affecting both the amplitude and phase of the shear and moment forces that are transmitted to the fuselage with the result that the net forces on the fuselage are such as to provide a minimum two/rev vibration in the area occupied by the pilot.

Of course, the pilot need not completely compensate for the effects of the rotor blade vibratory disturbances but can reduce them to an acceptable level. There may be circumstances or designs in which an attempt to reduce the effects of the rotor blade induced vibratory forces on the pilot to a point substantially less than an acceptable level will result in excessive or dangerous vibrations in other parts of the fuselage. Thus it may be prudent to provide a system in which complete compensation cannot be achieved. The purpose, in large part, is to provide a sufficiently comfortable ride so that the pilot's operational functions are not impaired and thus an acceptable level of vibrations at the pilot's seat may well be greater than the minimum that could be achieved by virtue of this invention.

If the force applied to the pylon results from a one/rev disturbance then the one/rev control can be used, as just described in connection with the two/rev control, to compensate for the effects of the one/rev disturbances. Of course, if the effects of both one/rev and two/rev disturbances are substantial, then both the one/rev and two/rev controls will be used, with the output of these controls summed by amplifier 150 to control piston 173 to apply a compensating force between pylon and fuselage.

FIG. 2 Embodiment

Figure 2:
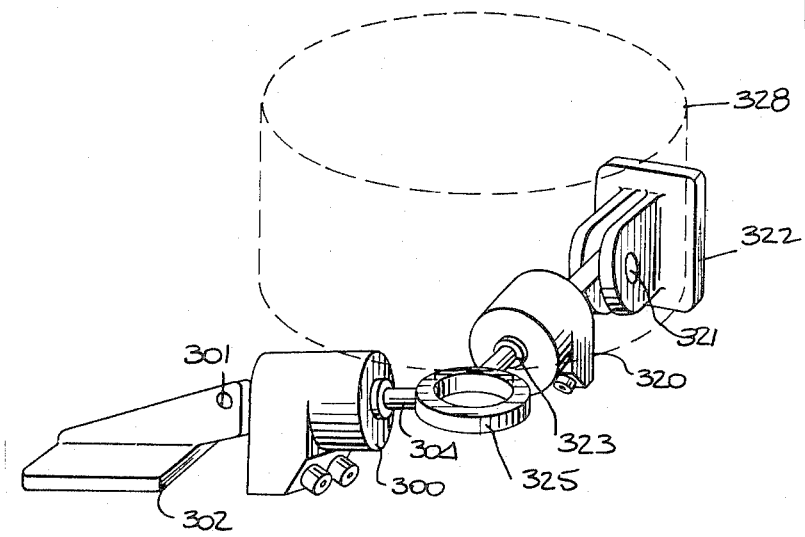
FIG. 2 illustrates apparatus used to control lateral and longitudinal directional force components of rotor blade vibratory disturbances and thus affect pitch and roll disturbances.

The embodiment of the invention disclosed in FIG. 2 is suited to compensate for the fore and aft and the lateral force components resulting from rotor blade vibratory disturbances and includes a pair of cylinders 300 and 320. Cylinder 300 is pivotally fixed at pivot point 301 to baseplate 302 and houses a piston which has a rod 304 projecting therefrom. Baseplate 302 is fastened to the helicopter fuselage so that piston rod 304 extends in the helicopter fore and aft direction. Cylinder 320 houses a piston which has a piston rod 323 extending therefrom and is pivotally affixed at pivot point 321 to baseplate 322. Baseplate 322 is affixed to the helicopter fuselage so that piston rod 323 extends in the helicopter lateral direction. Piston rods 304 and 323 are affixed to a ring 325 which is joined by any of the techniques available to the skilled mechanic to the pylon or the pylon gearbox 328. It is of course understood that ring 325 is a symbolic showing of having piston rods 304 and 323 jointly apply a force to the pylon through the pylon gearbox and any techniques that allow the piston rods to apply forces to the pylon or its associated structure in the appropriate directions can be used.

The embodiment of FIG. 2 operates similarly to the embodiment disclosed in FIG. 1 with the output of the amplifier controlling solenoid valves which are connected to cylinders 300 and 320, preferably as shown in FIG. 5, so that the pistons in the cylinders can apply compensating forces between the fuselage and the pylon. These compensating forces combine with the forces resulting from rotor blade vibratory disturbances to provide net shear and moment forces on the fuselage that result in minimum vibration at the pilot's seat.

In FIG. 2 apparatus is jointly shown to compensate for fore and aft as well as lateral components of the forces resulting from rotor blade vibratory disturbances. However, the structure used to isolate either the fore and aft or the lateral component of the forces resulting from the rotor blade vibratory disturbances could be used alone if it were desired to compensate for only one component of these forces on the helicopter fuselage.

Figure 3:
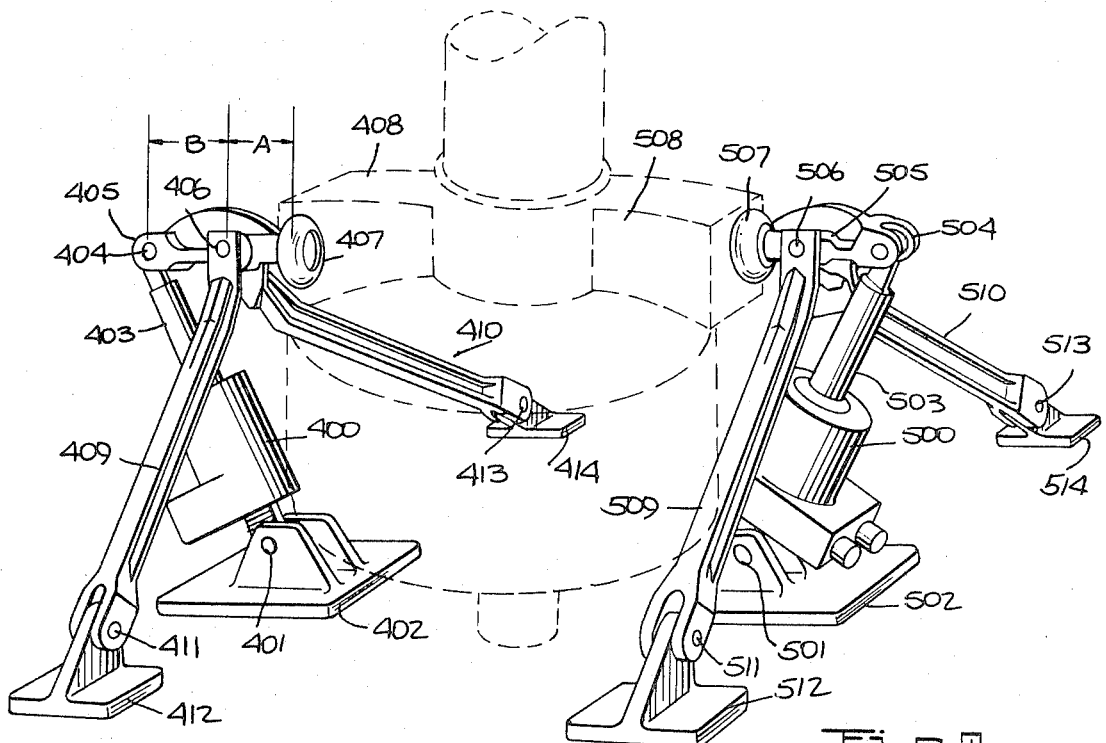
FIG. 3 illustrates apparatus that can be used to control the vertical force component of rotor blade vibratory disturbances.

The FIG. 3 Embodiment

The embodiment of FIG. 3 is suitable to compensate for the vertical component of the force resulting from rotor blade vibratory disturbances.

A cylinder 400 is supported at pivot point 401 of baseplate 402 with the baseplate being fastened to the helicopter fuselage. Cylinder 400 contains a piston which has a piston rod 403 projecting therefrom. Piston rod 403 is pivotally attached at pivot point 404 to a rigid lever 405. Lever 405 is pivoted about pivot point 406 and has a pad 407 affixed to its free end which is held fast to the left end of a bearing block 408 as viewed in FIG. 3, the bearing block 408 being affixed to the pylon structure. The bearing that forms pivot point 406 is supported by levers 409 and 410 with the levers lying in a common plane. Lever 409 is pivotally attached at pivot point 411 to a baseplate 412, with baseplate 412 being affixed to the helicopter fuselage. Lever 410 is pivotally attached at pivot point 413 to a baseplate 414 which is attached to the helicopter fuselage. Pivot points 401, 411 and 413 are in a common plane so that a mechanical advantage, in the ratio of B/A may be obtained by the force applied to bearing block 408 by pad 407 as compared with the force applied by a piston rod 403 to lever 405. By obtaining a mechanical advantage with lever 405 the size of cylinder 400 can be minimized.

As viewed in FIG. 3, apparatus is situated adjacent to the right end of a second bearing block 508, to apply a vertical force to the bearing block 508. The elements associated with the bearing block 508 are identical to the elements associated with the bearing block 408 and thus their reference numerals have the same last two digits as those employed for the elements associated with block 408.

The reason for using two pistons 403, 503 and cylinders 400, 500 at opposite ends of the pylon is to insure that no moment is applied by the pistons to the pylon. By having the pistons 403, 503 aligned with each other along a line that passes through the helicopter rotor shaft this problem is eliminated.

The apparatus of FIG. 3 is operated with cylinders 400 and 500 each controlled by separate solenoid valves joined to the summing amplifier and circuit disclosed in FIG. 1. The solenoid valve and cylinders 400 and 500 apply vertical forces through pads 407 and 507 to bearing blocks 408, 508 to compensate for the vertical force component of the rotor blade vibratory disturbances.

Figure 4:
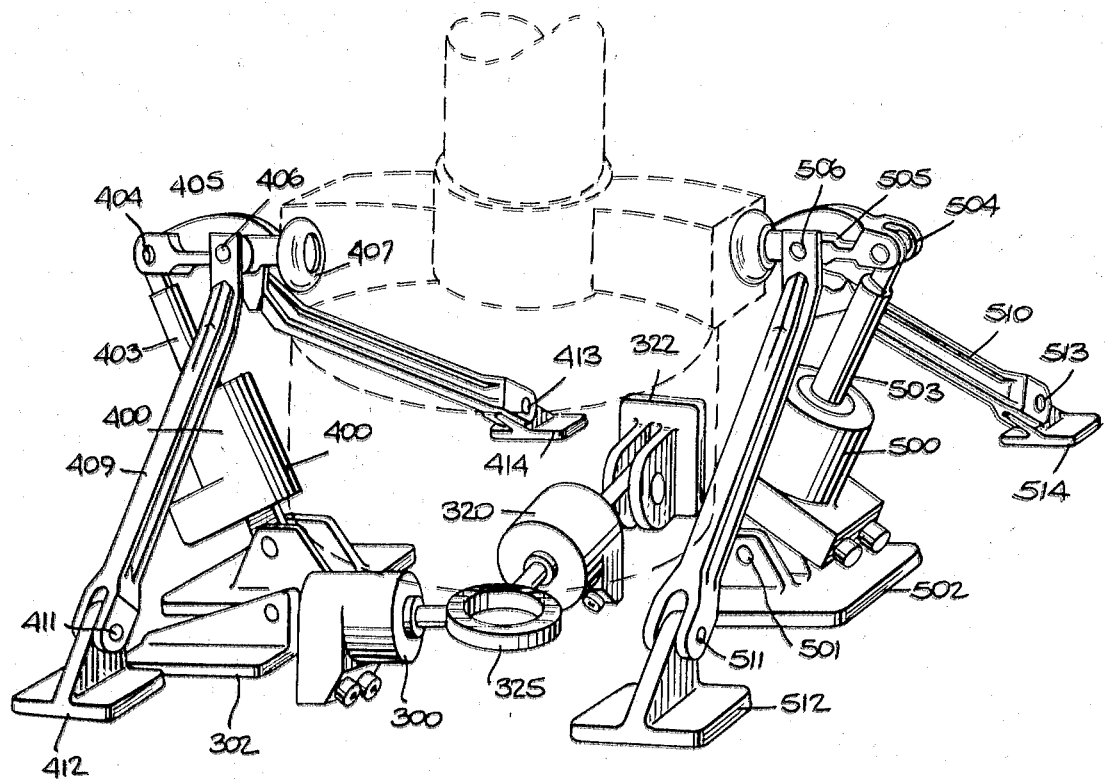
FIG. 4 is an illustration of apparatus, that is a combination of the FIG. 2 and FIG. 3 apparatus, to control all directional force components of rotor blade vibratory disturbances.

The FIG. 4 Embodiment

The embodiment of FIG. 4 is merely the sum of the embodiments of FIGS. 2 and 3 and is suited for controlling all the force components of the rotor blade vibratory disturbances on the helicopter fuselage.

If desired, the control system described above can be programmed to automatically apply a force or forces to the pylon without any action taken by the pilot. For example, this can be achieved where the magnitude of the one/rev and two/rev disturbances are known functions of airspeed. If the output of an airspeed sensor is fed into the one/rev and two/rev amplitude controls, these controls can be programmed to control the magnitude and/or phase of the force applied between pylon and fuselage to create a net force on the fuselage that minimizes the felt vibrations.

Although this invention has been described in connection with the control of one/rev and two/rev forces in a two bladed helicopter, it should be understood that the invention can be applied to control other frequencies, such as a four/rev disturbance, in a two-bladed helicopter and to whatever frequencies are of interest in helicopters having other than two blades.

Having thus described the invention, it is not intended that it be so limited as changes may be readily made therein without departing from the scope of the invention. Accordingly, it is intended that the subject matter described above and shown in the drawings be interpreted as illustrative and not in a limiting sense.

What is claimed is:

1. A system for compensating for the vibratory disturbances generated by rotation of a rotor blade of a rotary wing aircraft having a fuselage, a pylon, and a rotor and rotor blade assembly mounted on the pylon, the improvement comprising:
  a. means for compliantly mounting the pylon to the fuselage to permit limited motion of the pylon relative to the fuselage, the compliant mounting means including a pair of levers, means for compliantly attaching an end portion of each of said levers to a different one of substantially opposite sides of the pylon for supporting said pylon, and means for pivotally mounting each of said levers with respect to the fuselage;
  b. means connected between the fuselage and the pylon for applying reciprocating force to the fuselage along at least one of the axes parallel to the axes along which the vibratory disturbances are applied to the fuselage, said means for applying reciprocating force to the fuselage being coupled to said pair of levers, whereby reciprocating force can be applied to the fuselage by said reciprocating force applying means;
  c. means for generating a control signal which is solely a function of the rate of rotation of the rotor blade and which contains components consisting entirely of at least one integer multiple of the rate of rotation;
  d. means coupled to said force applying means for controlling the force applying means in response to the control signal to apply reciprocating force to the fuselage at each frequency of the control signal, said force applying means enabling another vibratory force to be applied to the fuselage with frequency equal to the vibratory disturbances generated by the rotation of the rotor blade; and
  e. means connected to said controlling means for selecting the phase of the control signal and thereby the phase of the reciprocating force relative to the vibratory disturbances to place the reciprocating force and the vibratory disturbances in a substantially opposite phase relationship relative to one another at a predetermined desired location within the fuselage.

2. The system of claim 1 in which said means for pivotally mounting the pair of levers is coupled to each of said pair of levers between the ends thereof and in which said force applying means is coupled to the end of each of said pair of levers opposite the end thereof attached to the pylon.

3. The system of claim 1 in which said means for pivotally mounting each of said levers with respect to the fuselage comprises a pair of ligaments for each of said levers each ligament having one end thereof pivotally connected with respect to said lever and the other end mounted with respect to the fuselage at a distance spaced apart from one another.

4. The system of claim 3 wherein the ligaments are pivotally connected to the fuselage.

* * * * *